United States Patent
Chen et al.

(10) Patent No.: US 9,054,603 B2
(45) Date of Patent: Jun. 9, 2015

(54) DC TO AC CONVERSION CIRCUIT WITH RESONANT CIRCUIT

(71) Applicant: INDUSTRIAL TECHNOLOGY RESEARCH INSTITUTE, Hsinchu (TW)

(72) Inventors: Po-Yen Chen, Taipei (TW); Ching-Tsai Pan, Hsinchu (TW); Pao-Chuan Lin, Hsinchu County (TW); Ming-Che Yang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 232 days.

(21) Appl. No.: 13/846,159

(22) Filed: Mar. 18, 2013

(65) Prior Publication Data

US 2014/0092662 A1    Apr. 3, 2014

(30) Foreign Application Priority Data

Oct. 1, 2012    (TW) .............................. 101136278 A

(51) Int. Cl.
*H02M 7/538*    (2007.01)
*H02M 7/5387*    (2007.01)
(Continued)

(52) U.S. Cl.
CPC .... *H02M 7/5387* (2013.01); *H02M 2001/0058* (2013.01); *H02M 2007/4815* (2013.01); *Y02B 70/1441* (2013.01); *Y02B 70/1491* (2013.01)

(58) Field of Classification Search
CPC . H02M 7/538; H02M 7/5387; Y02B 70/1441
USPC ............... 363/17, 21.02, 21.03, 98, 109, 123, 363/126, 127, 131, 132
See application file for complete search history.

(56) References Cited

U.S. PATENT DOCUMENTS 5,684,678 A * 11/1997 Barrett .......................... 363/17
7,450,405 B2   11/2008 Ponnaluri et al.
(Continued)

FOREIGN PATENT DOCUMENTS

CN    101867196 A    10/2010
CN    102005953 A    4/2011
(Continued)

OTHER PUBLICATIONS

Yongqiang Lang et al., A Novel Design Method of LCL Type Utility Interface for Three-Phase Voltage Source Rectifier, IEEE, 2005, p. 313-317.
James K. Phipps, A Transfer Function Approach to Harmonic Filter Design, IEEE Industry Applications Magazine, 1997, p. 68-82.
Weimin Wu et al., An LLCL Power Filter for Single-Phase Grid-Tied Inverter, IEEE Transactions on Power Electronics, 2012, p. 782-789, vol. 27, No. 2.
(Continued)

*Primary Examiner* — Adolf Berhane
*Assistant Examiner* — Yemane Mehari
(74) *Attorney, Agent, or Firm* — Morris Manning & Martin LLP; Tim Tingkang Xia, Esq.

(57) ABSTRACT

A DC to AC conversion circuit including an inverter, a first inductor, a first capacitor, a second inductor and a second capacitor is provided. The inverter has two input contact points and two output contact points. The input contact points receive a DC signal, and the output contact points output an AC signal. The first terminal of the first inductor is coupled to one of the two output contact points. The first capacitor is coupled to the first inductor in parallel. The first terminal of the second capacitor is coupled to the second terminal of the first inductor, and the second terminal of the second capacitor is coupled to another one of two output contact points. The first terminal of the second inductor is coupled to the first terminal of the second capacitor, and the second terminal of the second inductor is coupled to a load.

9 Claims, 5 Drawing Sheets

(51) Int. Cl.
*H02M 1/00* (2006.01)
*H02M 7/48* (2006.01)

(56) References Cited

U.S. PATENT DOCUMENTS

| | | | |
|---|---|---|---|
| 7,518,893 B2 | | 4/2009 | Ponnaluri et al. |
| 8,670,249 B2 * | | 3/2014 | Khajehoddin et al. .......... 363/39 |
| 2012/0106221 A1 * | | 5/2012 | Ochi et al. .................... 363/132 |

FOREIGN PATENT DOCUMENTS

| CN | 102075108 A | 5/2011 |
|---|---|---|
| TW | I285468 B | 8/2007 |
| TW | 200832901 A | 8/2008 |
| TW | I338448 B | 3/2011 |
| TW | 201123704 A | 7/2011 |

OTHER PUBLICATIONS

Parikshith Channegowda et al., Filter Optimization for Grid Interactive Voltage Source Inverters, IEEE Transactions on Industrial Electronics, 2010, p. 4106-4114, vol. 57, No. 12.

Marco Liserre et al., Design and Control of an LCL-Filter-Based Three-Phase Active Rectifier, IEEE Transactions on Industry Applications, 2005, p. 1281-1291, vol. 41, No. 5.

B. Bolsens et al., Model-Based Generation of Low Distortion Currents in Grid-Coupled PWM-Inverters Using an LCL Output Filter, 35th Annual IEEE Power Electronics Specialists Conference, 2004, p. 4816-4822.

Intellectual Property Office, Ministry of Economic Affairs, R.O.C., "Office Action", Apr. 21, 2014, Taiwan.

* cited by examiner

DC TO AC CONVERSION CIRCUIT WITH RESONANT CIRCUIT

CROSS-REFERENCE STATEMENT

This non-provisional application claims priority under 35 U.S.C. §119(a) on Patent Application No(s). 101136278 filed in Taiwan, R.O.C. on Oct. 1, 2012, the entire contents of which are hereby incorporated by reference.

TECHNICAL FIELD

The disclosure relates to a conversion circuit and more particularly to a DC to AC conversion circuit.

BACKGROUND

Generally, some DC to AC conversion circuits may have an inverter, and most of the inverters generate pulse width modulation (PWM) signals by using a high frequency switching manner. This may cause a great amount of high frequency harmonic current which influences the next stage circuits or equipments and causes some problems in the next stage circuits or equipments. Therefore, a filter connected to the AC output terminal of the inverter is quite important for the element selection and circuit design of a DC to AC conversion circuit.

Under the condition of the same inductance, as comparing with conventional L type filters, a LCL type filter is ideal for suppressing high frequency harmonic, and is gradually applied to the inverter having a high power and a low switching frequency.

Compared with the first order L filter, the LCL filter can meet the grid interconnection standards with significantly smaller size and cost, especially for applications above several kilowatts, but it might be more difficult to keep the system stable.

Although the LCL type filter has a good performance of filtering high frequency harmonic, the design process thereof is complicated and requires a trail-and-error manner of obtaining proper parameters because the character of the LCL type filter is easily affected by these parameters. Therefore, it is necessary to improve such DC to AC conversion circuits.

SUMMARY

The DC to AC conversion circuit according to the disclosure includes an inverter, a first inductor, a first capacitor, a second capacitor and a second inductor. The inverter has two input contact points and two output contact points. The two input contact points receive a DC signal, and the two output contact points generate an AC signal. The first inductor has a first terminal and a second terminal. The first terminal of the first inductor is coupled to one of the two output contact points of the inverter. The first capacitor has a first terminal and a second terminal. The first terminal of the first capacitor is coupled to the first terminal of the first inductor, and the second terminal of the first capacitor is coupled to the second terminal of the first inductor. The second capacitor has a first terminal and a second terminal. The first terminal of the second capacitor is coupled to the second terminal of the first inductor, and the second terminal of the second capacitor is coupled to another one of the two output contact points of the inverter. The second inductor has a first terminal and a second terminal. The first terminal of the second inductor is coupled to the first terminal of the second capacitor, and the second terminal of the second inductor is coupled to a load.

For purposes of summarizing, some aspects, advantages and features of some embodiments of the disclosure have been described in this summary. Not necessarily all of (or any of) these summarized aspects, advantages or features will be embodied in any particular embodiment of the disclosure. Some of these summarized aspects, advantages and features and other aspects, advantages and features may become more fully apparent from the following detailed description and the appended claims.

BRIEF DESCRIPTION OF THE DRAWINGS

The disclosure will become more fully understood from the detailed description given herein below for illustration only, and thus are not limited to the disclosure, and wherein.

DETAILED DESCRIPTION

The detailed features and advantages of the disclosure are described below in great detail through the following embodiments, the content of which is sufficient for those skilled in the art to understand the technical content of the disclosure and to implement the disclosure accordingly. Based on the content of the specification, the claims, and the drawings, those skilled in the art can easily understand the relevant objectives and advantages of the disclosure.

The embodiments described below use the same label for representing the same or similar components.

Figure 1:
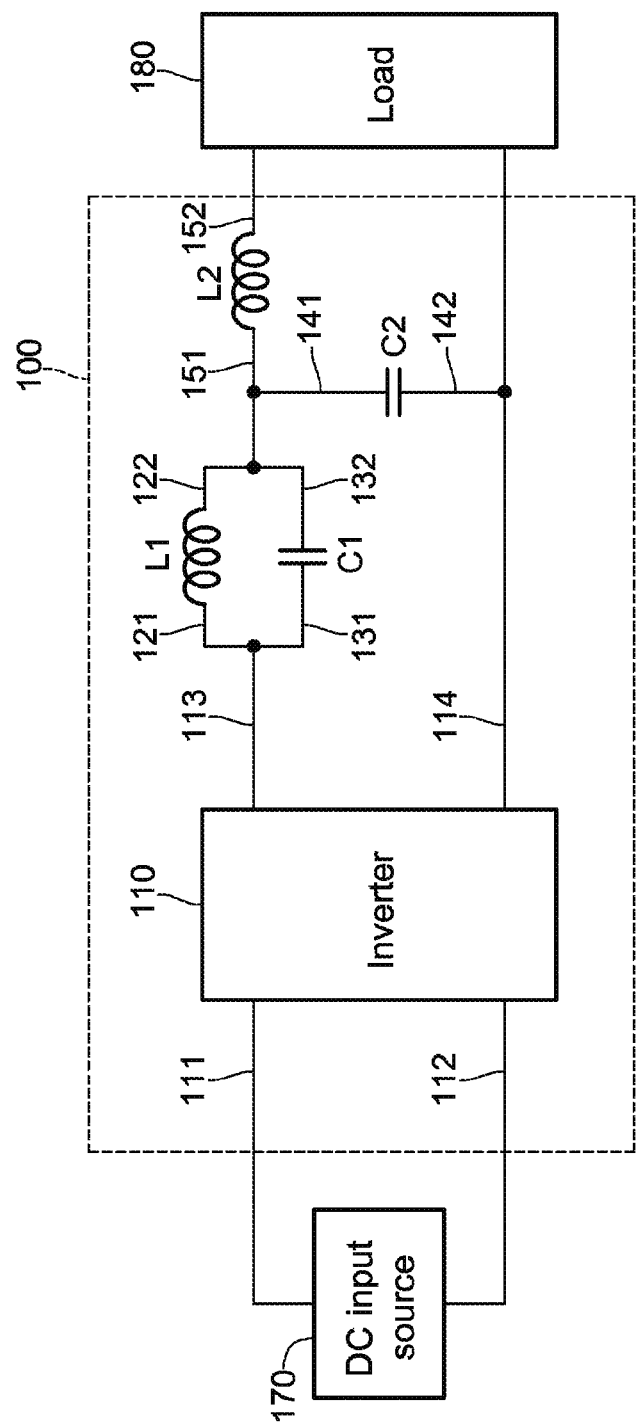
FIG. 1 shows a schematic diagram of a DC to AC conversion circuit according to a first embodiment of the disclosure.

FIG. 1 illustrates a block diagram of a DC to AC conversion circuit according to a first embodiment of the disclosure. The DC to AC conversion circuit 100 is coupled to a load 180 for providing requisite work voltage to the load 180. The load 180 may be a resistor, an inductor, or a power supply.

The DC to AC conversion circuit 100 in this embodiment includes an inverter 110, a first inductor L1, a first capacitor C1, a second capacitor C2 and a second inductor L2. The inverter 110 has two input contact points, namely an input contact point 111 and an input contact point 112, and has two output contact points, namely an output contact point 113 and an output contact point 114. The input contact points 111 and 112 are coupled to, for example, a DC input source 170 for receiving a DC signal generated by the DC input source 170. The inverter 110 processes the DC signal for outputting an AC signal from the output contact points 113 and 114 of the inverter 110. In this embodiment, the DC input source 170 is, for example, a DC current source.

The first inductor L1 has a first terminal 121 and a second terminal 122. The first terminal 121 of the first inductor L1 is coupled to one of the output contact points 113 and 114 of the inverter 110. In some embodiments, the first terminal 121 of the first inductor L1 is coupled to the output contact point 113 of the inverter 110. The first capacitor C1 has a first terminal 131 and a second terminal 132. The first terminal 131 of the first capacitor C1 is coupled to the first terminal 121 of the first inductor L1, and the second terminal 132 of the first capacitor C1 is coupled to the second terminal 122 of the first inductor L1, that is, the first capacitor C1 is connected with the first inductor L1 in parallel. The first inductor L1 and the first capacitor C1 form a resonant circuit.

The second capacitor C2 has a first terminal 141 and a second terminal 142. The first terminal 141 of the second capacitor C2 is coupled to the second terminal 122 of the first inductor L1, and the second terminal 142 of the second capacitor C2 is coupled to another one of the output contact points 113 and 114 of the inverter 110, namely the output contact point 114 of the inverter 110. The second inductor L2 has a first terminal 151 and a second terminal 152. The first terminal 151 of the second inductor L2 is coupled to the first terminal 141 of the second capacitor C2, and the second terminal 152 of the second inductor L2 is coupled to the load 180.

Firstly, when the DC to AC conversion circuit 100 starts working, the inverter 110 converts the received DC signal into the AC signal, and the AC signal is outputted to the resonant circuit formed by the first capacitor C1 and the first inductor L1 for energy storing. This causes that the voltage across the first capacitor C1 is increased rapidly. Subsequently, the resonant circuit formed by the first inductor L1 and the first capacitor C1 generates resonance for converting the energy stored in the first capacitor C, into an inductive current. The energy stored in the first capacitor C1 charges the second capacitor C2. Thus, the current ripples caused by the rapidly increasing energy may be suppressed.

While the energy stored in the first capacitor C1 is converted into the inductive current, by the soft switching operation of the inverter 110, the polarity of the voltage across the first capacitor C1 is inverted to be negative. In this way, the equivalent structure of the DC to AC conversion circuits 100 is changed. Herein, the energy is transmitted to the load 180 through the second capacitor C2 and the second inductor L2 to supply an operation voltage to the load 180. Therefore, the DC to AC conversion circuit 100 in this embodiment may have low electromagnetic influences (EMI), low ripple output voltage, and high conversion efficiency.

Figure 2:
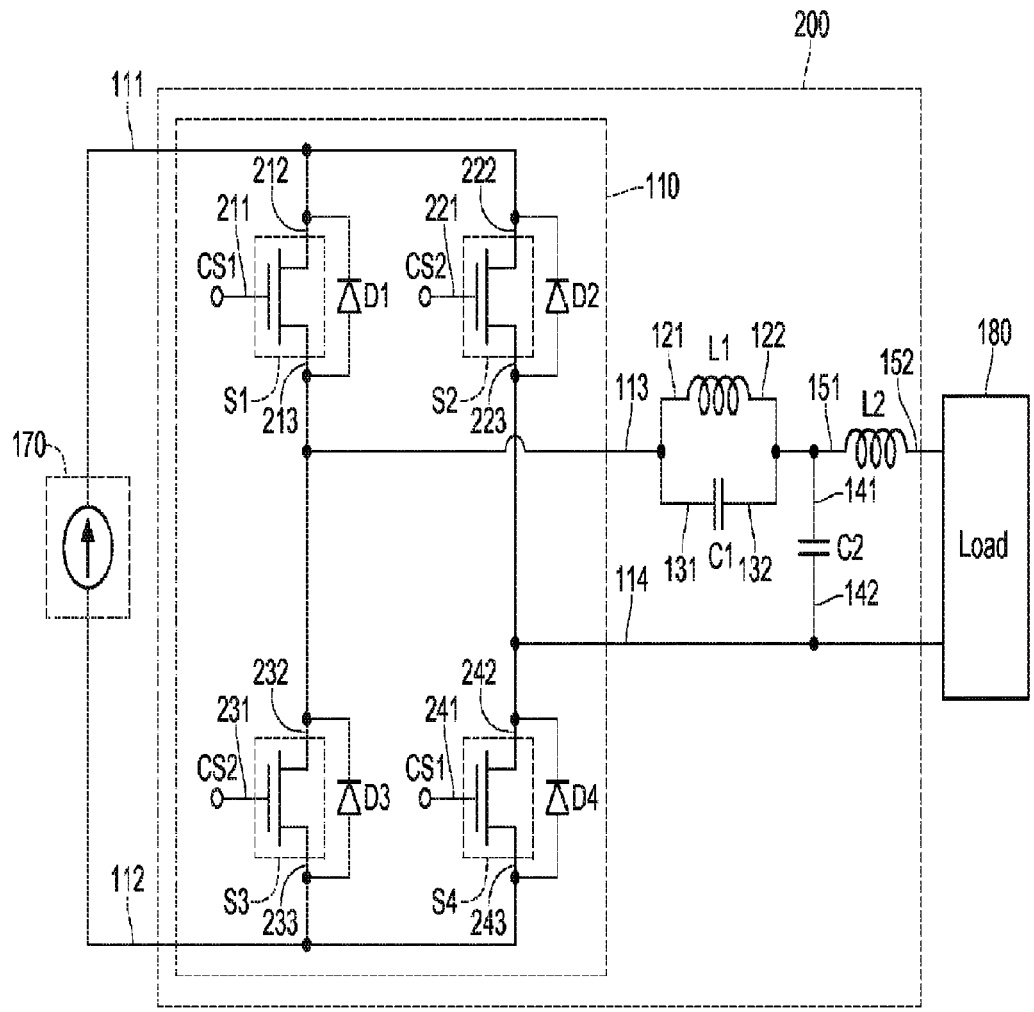
FIG. 2 shows a schematic diagram of a DC to AC conversion circuit according to a second embodiment of the disclosure.

FIG. 2 illustrates a schematic diagram of a DC to AC conversion circuit according to a second embodiment of the disclosure. The DC to AC conversion circuit 200 in this embodiment includes an inverter 110, a first inductor L1, a first capacitor C1, a second capacitor C2 and a second inductor L2. The coupling relations among the inverter 110, the first capacitor C1, the first inductor L1, the second capacitor C2 and the second inductor L2 refer to the descriptions of FIG. 1, thereby not repeatedly described again.

In this embodiment, the DC input source 170 is also a DC current source, and the inverter 110 is, for example, a full-bridge inverter. The inverter 110 includes a first switch S1, a second switch S2, a third switch S3, a fourth switch S4 and four free-wheeling diodes, namely the free-wheeling diodes D1, D2, D3 and D4.

The first switch S1 has a first terminal 211, a second terminal 212 and a third terminal 213. The first terminal 211 of the first switch S1 receives a first control signal CS1. The second terminal 212 of the first switch S1 is coupled to one of the input contact points 111 and 112 of the inverter 110. In some embodiments, the second terminal 212 of the first switch S1 is coupled to the input contact point 111 of the inverter 110. The third terminal 213 of the first switch S1 is coupled to one of the output contact points 113 and 114 of the inverter 110. In some embodiments, the third terminal 213 of the first switch S1 is coupled to the output contact point 113 of the inverter 110.

The second switch S2 has a first terminal 221, a second terminal 222 and a third terminal 223. The first terminal 221 of the second switch S2 receives a second control signal CS2. The second terminal 222 of the second switch S2 is coupled to the second terminal 212 of the first switch S1. The third terminal 223 of the second switch S2 is coupled to another one of the output contact points 113 and 114 of the inverter 110, namely the output contact point 114 of the inverter 110.

The third switch S3 has a first terminal 231, a second terminal 232 and a third terminal 233. The first terminal 231 of the third switch S3 receives the second control signal CS2. The second terminal 232 of the third switch S3 is coupled to the third terminal 213 of the first switch S1. The third terminal 233 of the third switch S3 is coupled to another one of the input contact points 111 and 112 of the inverter 110, namely the input contact point 112 of the inverter 110.

The fourth switch S4 has a first terminal 241, a second terminal 242 and a third terminal 243. The first terminal 241 of the fourth switch S4 receives the first control signal CS1. The second terminal 242 of the fourth switch S4 is coupled to the third terminal 223 of the second switch S2. The third terminal 243 of the fourth switch S4 is coupled to the third terminal 233 of the third switch S3.

In this embodiment, the first switch S1, the second switch S2, the third switch S3 and the fourth switch S4 are, for example, N type transistors. The first terminals 211, 221, 231 and 241 of the first switch S1, the second switch S2, the third switch S3 and the fourth switch S4 are respectively the gate terminal of the N type transistor, the second terminals 212, 222, 232 and 242 of the first switch S1, the second switch S2, the third switch S3 and the fourth switch S4 are respectively the drain terminal of the N type transistor, and the third terminals 213, 223, 233 and 243 of the first switch S1, the second switch S2, the third switch S3 and the fourth switch S4 are respectively the source terminal of the N type transistor. However, in some embodiments, the first switch S1, the second switch S2, the third switch S3 and the fourth switch S4 are P type transistors or other kinds of switch elements.

The free-wheeling diodes D1, D2, D3 and D4 are reversely coupled to the first switch S1, the second switch S2, the third switch S3, and the fourth switch S4 respectively in parallel. The first control signal CS1 and the second control signal CS2 complement each other in a period except a dead zone period in which the first control signal CS1 and the second control signal CS2 are at an off-logic level simultaneously. In other word, the first control signal CS1 is at an on-logic level while the second control signal CS2 is at an off-logic level, and the first control signal CS1 is at an off-logic level while the second control signal CS2 is at an on-logic level.

In the first state in this embodiment, when the DC to AC conversion circuit 200 starts working, the first control signal CS1 is at an on-logic level and the second control signal CS2 is at an off-logic level. The first switch S1 and the fourth switch S4 are turned on, and the second switch S2 and the third switch S3 are turned off. Thus, the DC to AC conversion circuit 200 enters a first mode. Herein, the DC signal generated by the DC input source 170 is transmitted to the resonant circuit formed by the first inductor L1 and the first capacitor C1 through the first switch S1 and the fourth switch S4, thereby charging the first inductor L1, the first capacitor C1 and the second capacitor C2.

In the second state in this embodiment, the first control signal CS1 is changed to at an off-logic level, and the second control signal CS2 is maintained at an off-logic level. The first switch S1, the second switch S2, the third switch S3 and the fourth switch S4 are turned off. Thus, the DC to AC conversion circuit 200 enters a second mode. Herein, by the soft switching operations of the inverter 110, the free-wheeling diodes D2 and D3 are turned on. Moreover, the polarity of the voltage across the first capacitor C1 is inverted and becomes negative, so that the first capacitor C1 and first inductor L1 cooperate with the free-wheeling diodes D2 and D3 and the parasitic capacitors of the first switch S1 and the fourth switch S4 to form a loop. The equivalent circuit structure of the DC to AC conversion circuit 200 is changed. The DC to AC conversion circuit 200 uses the second capacitor C2 and the second inductor L2 to transmit the stored energy to the load 180 so as to supply an operation voltage to the load 180.

In the third state in this embodiment, the first control signal CS1 maintains at an off-logic level, and the second control signal CS2 is changed to at an on-logic level. The second switch S2 and the third switch S3 are turned on, and the first switch S1 and fourth switch S4 are turned off. The DC to AC conversion circuit 200 enters a third mode. Herein, the DC signal generated by the DC input source 170 is transmitted to the resonant circuit formed by the first capacitor C1 and the first inductor L1 through the second switch S2 and the third switch S3 so as to charge the first inductor L1, the first capacitor C1 and the second capacitor C2.

In the fourth state in this embodiment, the first control signal CS1 maintains at an off-logic level, and the second control signal CS2 is changed to at an off-logic level. The first switch S1, the second switch S2, the third switch S3 and the fourth switch S4 are turned off. The DC to AC conversion circuit 200 enters a fourth mode. Herein, by the soft switching operations of the inverter 110, the free-wheeling diodes D2 and D3 are turned on. The polarity of the voltage across the first capacitor C1 is inverted and becomes negative, so that the first capacitor C1 and first inductor L1 cooperate with the free-wheeling diodes D2 and D3 and the parasitic capacitors of the first switch S1 and the fourth switch S4 to form a loop. The stored energy is transmitted to the load 180 by the second capacitor C2 and the second inductor L2 to supply the operation voltage to the load 180. Through the process of the above four states, the DC to AC conversion circuit 200 completes one cycle of the operation thereof.

In addition, in some embodiments, the inductance of the first inductor L1 can be smaller than the inductance of the second inductor L2, which causes the potential of the current flowing through the first inductor L1, relatively larger. Herein, the disclosure is available to use the first capacitor C1 of a smaller capacitance, which causes the negative voltage of the first capacitor C1 of the smaller capacitance the same as the negative voltage of the first capacitor C1 of a relative greater capacitance when the polarity of the voltage across the first capacitor C1 is inverted.

Figure 3:
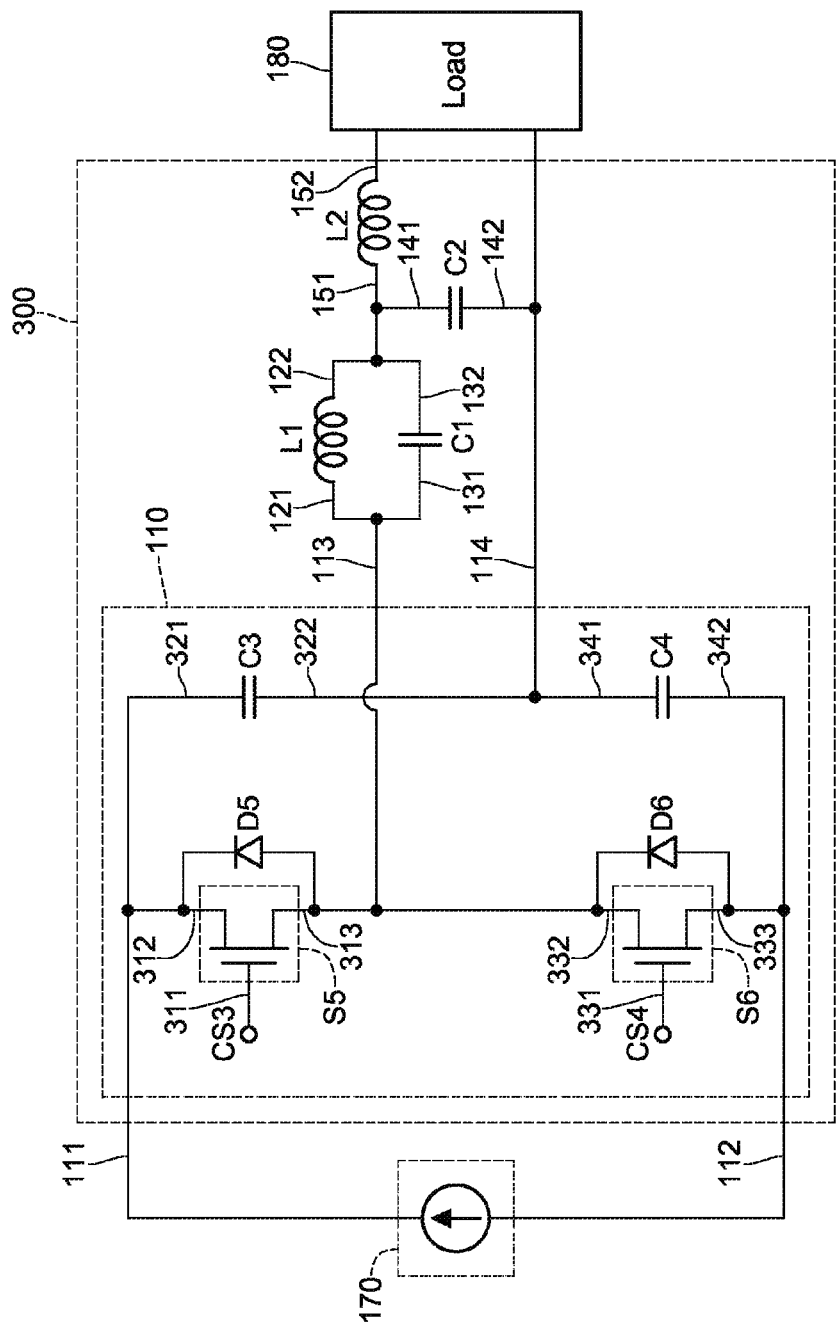
FIG. 3 shows a schematic diagram of a DC to AC conversion circuit according to a third embodiment of the disclosure.

FIG. 3 illustrates a schematic diagram of a DC to AC conversion circuit according to a third embodiment of the disclosure. The DC to AC conversion circuit 300 in this embodiment includes an inverter 110, a first inductor L1, a first capacitor C1, a second capacitor C2 and a second inductor L2.

In this embodiment, the inverter 110 is, for example, a half-bridge inverter. The inverter 110 includes a fifth switch S5, a sixth switch S6, a third capacitor C3, a fourth capacitor C4, and two free-wheeling diodes, namely the free-wheeling diodes D5 and D6.

The fifth switch S5 has a first terminal 311, a second terminal 312 and a third terminal 313. The first terminal 311 of the fifth switch S5 receives a third control signal CS3. The second terminal 312 of the fifth switch S5 is coupled to one of the input contact points 111 and 112 of the inverter 110, and the third terminal 313 of the fifth switch S5 is coupled to one of the output contact points 113 and 114 of the inverter 110.

In some embodiments, the second terminal 312 of the fifth switch S5 is coupled to the input contact point 111 of the inverter 110, and the third terminal 313 of the fifth switch S5 is coupled to the output contact point 113 of the inverter 110. The third capacitor C3 has a first terminal 321 and a second terminal 322. The first terminal 321 of the third capacitor C3 is coupled to the second terminal 312 of the fifth switch S5. The second terminal 322 of the third capacitor C3 is coupled to another one of the output contact points 113 and 114 of the inverter 110, namely the output contact point 114 of the inverter 110.

The sixth switch S6 has a first terminal 331, a second terminal 332 and a third terminal 333. The first terminal of the sixth switch S6 receives a fourth signal CS4. The second terminal 332 of the sixth switch S6 is coupled to the third terminal 313 of the fifth switch S5. The third terminal 333 of the sixth switch S6 is coupled to another one of the input contact points 111 and 112 of the inverter 110, namely the input contact point 112 of the inverter 110.

In this embodiment, the fifth switch S5 and the sixth switch S6 are, for example, N type transistors. The first terminals 311 and 331 of the fifth switch S5 and the sixth switch S6 are respectively the gate terminals of the N type transistors, the second terminals 312 and 332 of the fifth switch S5 and the sixth switch S6 are respectively the drain terminals of the N type transistors, and the third terminals 313 and 333 of the fifth switch S5 and the sixth switch S6 are respectively the source terminals of the N type transistors. In some embodiments, the fifth switch S5 and the sixth switch S6 can be P type transistors or other kinds of switch elements.

The fourth capacitor C4 has a first terminal 341 and a second terminal 342. The first terminal 341 of the fourth capacitor C4 is coupled to the second terminal 322 of the third capacitor C3, and the second terminal 342 of the fourth capacitor C4 is coupled to the third terminal 333 of the sixth switch S6.

The free-wheeling diodes D5 and D6 are reversely coupled to the fifth switch S5 and the sixth switch S6 in parallel respectively. The third control signal CS3 and the fourth control signal CS4 complement each other in a period except a dead zone period in which the third control signal CS3 and the fourth control signal CS4 are at an off-logic level simultaneously. In other word, the fourth control signal CS4 is at an off-logic level while the third control signal CS3 is at an on-logic level, and the fourth control signal CS4 is at an on-logic level while the third control signal CS3 is at an off-logic level. An example is taken as follows to describe the states of the third control signal CS3 and the fourth control signal CS4.

In the first state of this embodiment, when the DC to AC conversion circuit 300 starts working, the third control signal CS3 is at an on-logic level and the fourth control signal CS4 is at an off-logic level. The fifth switch S5 is turned on, and the sixth switch S6 is turned off. The DC to AC conversion circuit 300 enters a first mode. Herein, the DC signal generated by the DC input source 170 is transmitted to the resonant circuit formed by the first inductor L1 and the first capacitor C1 through the fifth switch S5 and the fourth capacitor C4 to charge the first inductor L1, the first capacitor C1 and the second capacitor C2.

In the second state of this embodiment, the third control signal CS3 is changed to at an off-logic level, and the fourth control signal CS4 maintains at an off-logic level. The fifth switch S5 and the sixth switch S6 are turned off. The DC to AC conversion circuit 300 enters a second mode. Herein, by the soft switching operations of the inverter 110, the free-wheeling diode D6 is turned on, and the polarity of the voltage across the first capacitor C1 is inverted and becomes negative. The first capacitor C1 and the first inductor L1 cooperate with the free-wheeling diode D6, the parasitic capacitors of the fifth switch S5, the third capacitor C3 and the fourth capacitor C4 to form a loop, thereby transmitting the stored energy to the load 180 through the second capacitor C2 and the second inductor L2 to supply the operation voltage to the load 180.

In the third state of this embodiment, the third control signal CS3 maintains at an off-logic level, and the fourth control signal CS4 is changed to at an on-logic level. The sixth switch S6 is turned on, and the fifth switch S5 is turned off. The DC to AC conversion circuit 300 enters a third mode. Herein, the DC signal generated by the DC input source 170 is transmitted to the resonant circuit formed by the first inductor L1 and the first capacitor C1 through the sixth switch S6 and the third capacitor C3 to charge the first inductor L1, the first capacitor C1 and the second capacitor C2.

In the fourth state of this embodiment, the third control signal CS3 maintains at an off-logic level, and the fourth control signal CS4 is changed to at an off-logic level. The fifth switch S5 and the sixth switch S6 are turned off. The DC to AC conversion circuit 300 enters a fourth mode. Herein, by the soft switching operations of the inverter 110, the free-wheeling diode D6 is turned on, and the polarity of the voltage across the first capacitor C1 is inverted and becomes negative. The first capacitor C1 and the first inductor L1 cooperate with the free-wheeling diode D5, the parasitic capacitor of the sixth switch S6, the third capacitor C3 and the fourth capacitor C4 to form a loop, thereby transmitting the stored energy to the load 180 through the second capacitor C2 and the second inductor L2 to supply the operation voltage to the load 180. Through the above four states, the DC to AC conversion circuit 300 completes one cycle of operation thereof.

Figure 4:
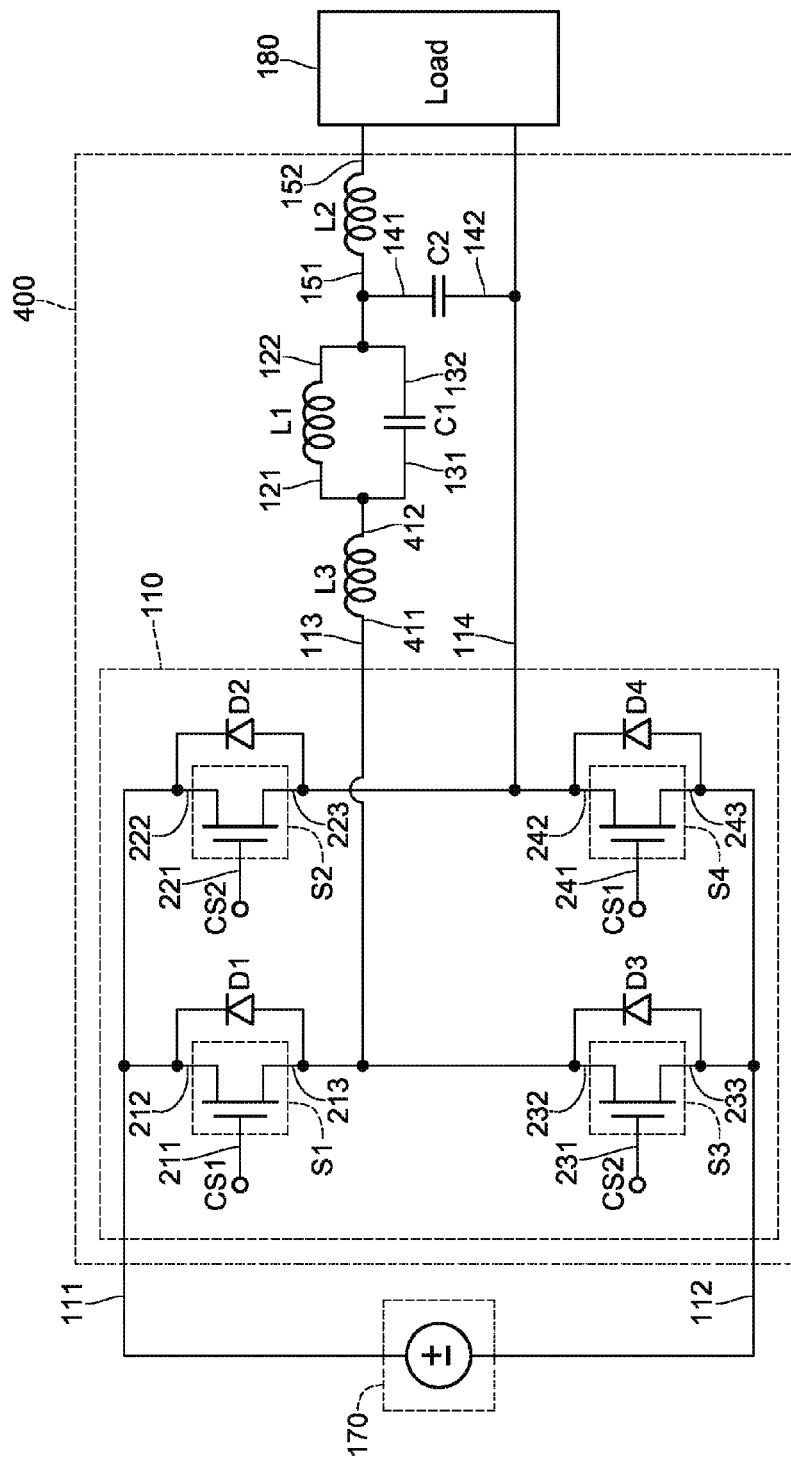
FIG. 4 shows a schematic diagram of a DC to AC conversion circuit according to a fourth embodiment of the disclosure.

FIG. 4 illustrates a schematic diagram of a DC to AC conversion circuit according to a fourth embodiment of the disclosure. The DC to AC conversion circuit 400 in this embodiment includes an inverter 110, a first inductor L1, a first capacitor C1, a second capacitor C2, a second inductor L2 and a third inductor L3. The connection relations among the inverter 110, the first inductor L1, the first capacitor C1, the second inductor L2 and the second capacitor C2 refer to their counterparts in FIG. 2, thereby not repeatedly described again.

The differences between the DC to AC conversion circuit 400 and the DC to AC conversion circuit 200 in FIG. 2 are that the DC input source 170 in this embodiment is a DC voltage source in contrast to a DC current source as the DC input source 170 in FIG. 2, and that the DC to AC conversion circuit 400 further includes the third inductor L3.

The third inductor L3 has a first terminal 411 and a second terminal 412. The first terminal 411 of the third inductor L3 is coupled to the output contact point 113 of the inverter 110. The second terminal 412 of the third inductor L3 is coupled to the first terminal 121 of the first inductor L1. That is, the third inductor L3 is coupled between the first terminal 121 of the first inductor L1 and one of the output contact points 113 and 114 of the inverter 110. The third inductor L3 is capable of avoiding inrush currents so as to protect the next stage circuits.

The operation of the DC to AC conversion circuit 400 in this embodiment can refer to the implementation of the DC to AC conversion circuit 200 in FIG. 2, thereby not repeatedly described again. Moreover, the DC to AC conversion circuit 400 can use the soft switching operation to reduce the energy leakage caused by the switches switching, the electromagnetic influence and the ripple output voltage, and to increase the high conversion efficiency.

Figure 5:
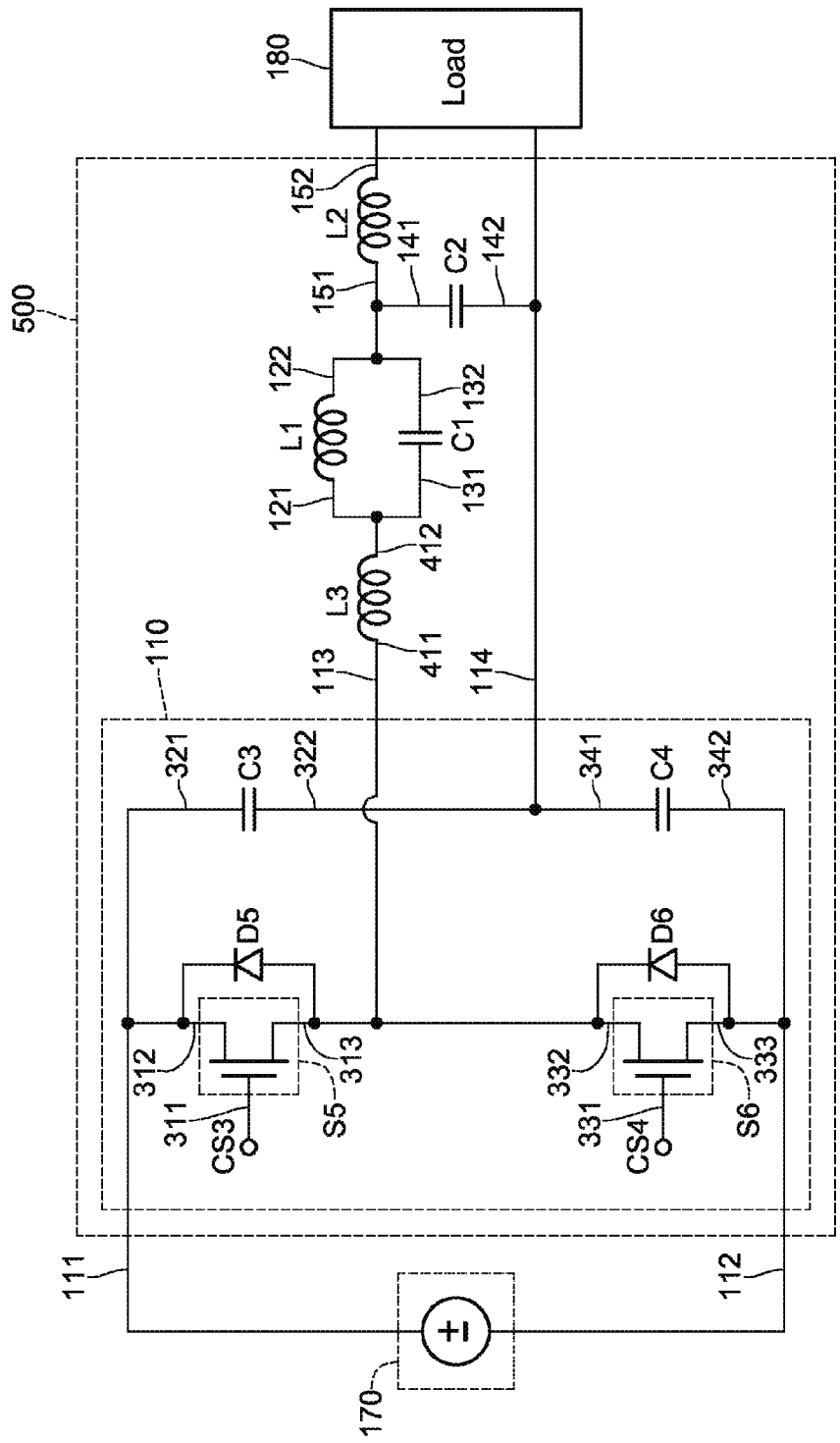
FIG. 5 shows a schematic diagram of a DC to AC conversion circuit according to a fifth embodiment of the disclosure.

FIG. 5 illustrates a schematic diagram of a DC to AC conversion circuit according to a fifth embodiment of the disclosure. The difference between the DC to AC conversion circuit 500 in this embodiment and the DC to AC conversion circuit 400 in FIG. 4 is that the inverter 110 in this embodiment is a half-bridge inverter in contrast to a full-bridge inverter as the inverter 110 in FIG. 4 is a full-bridge inverter. The differences between the DC to AC conversion circuit 500 in this embodiment and the DC to AC conversion circuit 300 in FIG. 3 are that the DC input source 170 in this embodiment is a DC voltage source in contrast to a DC current source as the DC input source 170 in FIG. 3, and that the DC to AC conversion circuit 500 in this embodiment further includes a third inductor L3.

Therefore, the operation of the DC to AC conversion circuit 500 in this embodiment can refer to the implementations of the DC to AC conversion circuits 300 and 400 in FIGS. 3 and 4, thereby not repeatedly described again. In addition, the DC to AC conversion circuit 500 can also use the soft switching operation to reduce the energy leakage caused by the switches switching, the low electromagnetic influence, and the ripple output voltage, and to increase the conversion efficiency.

By using the inverter, the resonant circuit formed by the first capacitor and the first inductor, and the circuit structure of the second inductor and the second capacitor, the DC to AC conversion circuit of the disclosure may reduce the energy leakage caused by the switches switching, and the polarity of the voltage across the first capacitor is inverted and becomes negative so as to reduce the potential barrier in the load voltage. In addition, the inductance of the first inductor can be smaller than the inductance of the second inductor, which causes the current flowing through the first inductor, relatively larger. Herein, the negative voltage across the first capacitor may be maintained when the polarity of the voltage across the first capacitor is inverted. Moreover, when the DC input source is a DC voltage source and the third inductor is disposed between the inverter and the first inductor, the disclosure may avoid the generation of inrush currents so as to protect the next stage circuits. Therefore, the complexity of the design, the electromagnetic influence and the low ripple output voltage may be reduced, and the conversion efficiency may be increased.

The disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A DC to AC conversion circuit, comprising:
    an inverter having two input contact points and two output contact points, the two input contact points receiving a DC signal, and the two output contact points outputting an AC signal;
    a first inductor having a first terminal and a second terminal, and the first terminal of the first inductor coupled to one of the two output contact points of the inverter;
    a first capacitor having a first terminal and a second terminal, the first terminal of the first capacitor coupled to the first terminal of the first inductor, and the second terminal of the first capacitor coupled to the second terminal of the first inductor;
    a second capacitor having a first terminal and a second terminal, the first terminal of the second capacitor coupled to the second terminal of the first inductor, and the second terminal of the second capacitor coupled to another one of the two output contact points of the inverter and a load; and a second inductor having a first terminal and a second terminal, the first terminal of the second inductor coupled to the first terminal of the second capacitor, and the second terminal of the second inductor coupled to the load;

wherein the AC signal is outputted to the first inductor and the first capacitor so as to store energy and to charge the second capacitor with the stored energy, and the inverter inverts a polarity of a voltage across the first capacitor by using a soft switching operation so as to transmit the stored energy to the load.

2. The DC to AC conversion circuit according to claim 1, wherein the DC signal is a DC voltage source.

3. The DC to AC conversion circuit according to claim 2, further comprising a third inductor coupled between one of the two output contact points of the inverter and the first terminal of the first inductor.

4. The DC to AC conversion circuit according to claim 1, wherein the DC signal is a DC current source.

5. The DC to AC conversion circuit according to claim 1, wherein an inductance of the first inductor is smaller than an inductance of the second inductor.

6. The DC to AC conversion circuit according to claim 1, wherein the inverter is a full-bridge inverter.

7. The DC to AC conversion circuit according to claim 6, wherein the inverter includes:

a first switch having a first terminal, a second terminal and a third terminal, the first terminal of the first switch receiving a first control signal, the second terminal of the first switch coupled to one of the two input contact points of the inverter, and the third terminal of the first switch coupled to one of the two output contact points of the inverter;

a second switch having a first terminal, a second terminal and a third terminal, the first terminal of the second switch receiving a second control signal, the second terminal of the second switch coupled to the second terminal of the first switch, and the third terminal of the second switch coupled to another one of the two output contact points of the inverter;

a third switch having a first terminal, a second terminal and a third terminal, the first terminal of the third switch receiving the second control signal, the second terminal of the third switch coupled to the third terminal of the first switch, and the third terminal of the third switch coupled to another one of the two input contact points of the inverter;

a fourth switch having a first terminal, a second terminal and a third terminal, the first terminal of the fourth switch receiving the first control signal, the second terminal of the fourth switch coupled to the third terminal of the second switch, and the third terminal of the fourth switch coupled to the third terminal of the third switch; and four free-wheeling diodes reversely coupled to the first switch, the second switch, the third switch and the fourth switch in parallel respectively, the first control signal and the second control signal complementing each other in a period except a dead zone period in which the first control signal and the second control signal are at an off-logic level simultaneously.

8. The DC to AC conversion circuit according to claim 1, wherein the inverter is a half-bridge inverter.

9. The DC to AC conversion circuit according to claim 8, wherein the inverter includes:

a fifth switch having a first terminal, a second terminal and a third terminal, the first terminal of the fifth switch receiving a third control signal, the second terminal of the fifth switch coupled to one of the two input contact points of the inverter, and the third terminal of the fifth switch coupled to one of the two output contact points of the inverter;

a third capacitor having a first terminal and a second terminal, the first terminal of the third capacitor coupled to the second terminal of the fifth switch, and the second terminal of the third capacitor coupled to another one of the two output contact points of the inverter;

a sixth switch having a first terminal, a second terminal and a third terminal, the first terminal of the sixth switch receiving a fourth control signal, the second terminal of the sixth switch coupled to the third terminal of the fifth switch, and the third terminal of the sixth switch coupled to another one of the two input contact points of the inverter;

a fourth capacitor having a first terminal and a second terminal, the first terminal of the fourth capacitor coupled to the second terminal of the third capacitor, and the second terminal of the fourth capacitor coupled to the third terminal of the sixth switch; and two free-wheeling diodes reversely coupled to the fifth switch and the sixth switch in parallel respectively, the third control signal and the fourth control signal complementing each other in a period except a dead zone period in which the third control signal and the fourth control signal are at an off-logic level simultaneously.

* * * * *